United States Patent Office 3,591,417
Patented July 6, 1971

3,591,417
NICKEL-CADMIUM STORAGE BATTERY
Peter Ness, Kelkheim, and Antony Oliapuram, Frankfurt am Main, Germany, assignors to Varta Aktiengesellschaft, Frankfurt am Main, Germany
No Drawing. Filed Apr. 9, 1969, Ser. No. 814,804
Claims priority, application Germany, Apr. 11, 1968, P 17 71 151.2
Int. Cl. H01m 43/04
U.S. Cl. 136—24                           4 Claims

ABSTRACT OF THE DISCLOSURE

An improved nickel-cadmium storage battery is constructed with the carrier of the positive electrode made of a diamagnetic or paramagnetic material, which is not oxidized when the battery is charged, for instance, gold or gold-plated copper, and with the carrier of the negative material made of a diamagnetic or paramagnetic substance, for instance copper.

---

The invention relates to storage batteries and more specifically to storage batteries of the nickel-cadmium type.

Nickel-cadmium batteries are particularly suitable in space aviation because of their sturdiness, high durability and because leakage of gases does not occur. In conventional nickel-cadmium batteries, the carrier for the active materials has been made from a matrix of nickel, for instance expanded nickel. It has also been known to use a carrier consisting of a matrix of sintered nickel. Nickel, however, as well as iron and cobalt and certain alloys which have ferromagnetic properties, are not satisfactory for use in space aviation, for instance for the supply of energy in the case of space probes and relay satellites, because for these applications, it is necessary to have batteries which do not contain magnetic substances.

Every substance has a certain amount of magnetic properties, and specifically either diamagnetic or paramagnetic properties. Ordinarily, however, these magnetic properties are very small, except for ferromagnetic materials. The magnetic properties may be quantitatively determined by evaluation of the relative magnetic permeability. This relative permeability for diamagnetic materials is a little less than 1 and for paramagnetic materials it is somewhat greater than 1. However, in the case of ferromagnetic substances, the relative permeability is of or order of up to $10^6$ times greater than 1. Manifestly, if storage batteries of the nickel-cadmium type are to be used in space aviation, ferromagnetic substances must be avoided.

The object of this invention is to provide a storage battery which has the same advantages of sturdiness and high durability as the conventional nickel-cadmium batteries and in which the carrier for the active electrodes is made of a substance which is not ferromagnetic.

The crux of this invention resides in providing a storage battery in which the carrier of the positive active material is made of a substance which is not oxidized when the battery is being charged and which is diamagnetic or paramagnetic and in which the carrier for the negative material is also made of a diamagnetic or paramagnetic substance. As the carrier for the positive material, gold, or copper with a coating of a noble metal, for instance gold, such as gold-plated copper, are advantageously used.

A suitable substance for the carrier of the negative material is copper.

The thickness of the gold layer or the copper carrier is about 10 microns.

The negative cadmium and the positive nickel materials retain their magnetic properties during the charging and the discharging phases. The cadmium material exhibits diamagnetism and the nickel material exhibits paramagnetism. Thus both active materials satisfy the requirement of excluding ferromagnetic substances, and this applies also to the temperature conditions encountered when these materials are utilized in space probes.

By way of example, the following values are obtained for the relative permeability of the nickel hydroxide material, in accordance with this invention:

$Ni(OH)_2$
    $\mu_r = 1.0025$; $T = 20°$ C.
    $\mu_r = 1.0120$; $T = -196°$ C.
$Ni(OH)_3$
    $\mu_r = 1.0009$; $T = 20°$ C.
    $\mu_r = 1.0053$; $T = -196°$ C.

If the carriers for the active materials commonly known are used, this requirement is not fulfilled.

In accordance with this invention, the carrier may be made of expanded copper or it may also consist of a matrix of sintered material, for instance copper powder. It is essential that the metal, in addition to exhibiting diamagnetic or paramagnetic properties, be resistant to strong alkaline solutions. The metal must also be resistant to corrosion when exposed to anodic current loads and must have electrical conductivity. The gold layer on the copper carrier of the positive electrode must be free from pores.

The gold layer on the copper carrier of the positive electrode is essential. In fact, if the gold layer is omitted, during the charging of the active nickel material, the copper carrier undergoes oxidative changes, before the nickel material reaches its full charge. Examination and comparison of the redox potentials of the hydroxides of copper, nickel and gold in alkaline solution, against a conventional hydrogen electrode demonstrate that the gold layer on the copper carrier of the positive electrode, is essential.

|  | mv. |
|---|---|
| $Cu/Cu_2O$ | $-358$ |
| $Ni(OH)_2/Ni.O.OH$ | $+490$ |
| $Au/H_2AuO_3$ | $+700$ |

On the other hand, when the negative electrode is charged, a potential of at least $-809$ mv. (with reference to the hydrogen electrode) is obtained. This potential corresponds to the equilibrium $Cd/Cd(OH)_2$ of the cadmium electrode. With this potential and at the pH range of the nickel-cadmium battery, metallic copper is stable and a protective coating of a noble metal on the carrier of the negative electrode is not necessary.

Many processes may be used for the preparation of the copper carrier with a layer of gold, for instance the gold layer may be applied by galvanization or chemical methods.

The advantages resulting from the present invention may be readily appreciated, if one considers that it is possible to achieve a storage battery of superior durability and suitable for a variety of applications, particularly in space aviation.

What is claimed is:

1. A storage battery with positive nickel hydroxide electrode and negative cadmium electrode, each having a conductive carrier free of ferromagnetism, wherein said positive electrode carrier is comprised of copper plated with gold and said negative carrier consists of copper.

2. The battery according to claim 1 wherein the gold plate on the copper carrier is of thickness of about 10 microns.

3. The battery according to claim 1 wherein the carrier of the positive electrode consists of expanded copper with a layer of gold free from pores.

4. The battery according to claim 1 wherein the carrier of the positive electrode consists of sintered copper powder with a layer of gold free from pores.

References Cited

UNITED STATES PATENTS

| 3,235,473 | 2/1966 | LeDuc | 136—120FC |
| 3,262,815 | 7/1966 | Langer et al. | 136—28 |
| 3,335,033 | 8/1967 | Kober | 136—28 |
| 3,388,004 | 6/1968 | Rosenblatt | 136—120FC |
| 3,498,842 | 3/1970 | Rowlette | 136—28 |

WINSTON A. DOUGLAS, Primary Examiner

C. F. LEFEVOUR, Assistant Examiner

U.S. Cl. X.R.

136—28, 36, 56